United States Patent [19]

Metzelfeld

[11] Patent Number: 5,033,592
[45] Date of Patent: Jul. 23, 1991

[54] SPRING APPLIED/PRESSURE RELEASE EMERGENCY BRAKE ACTUATOR

[75] Inventor: Glenn S. Metzelfeld, Brookfield, Wis.

[73] Assignee: Hayes Industrial Brake, Inc., Mequon, Wis.

[21] Appl. No.: 477,227

[22] Filed: Feb. 8, 1990

[51] Int. Cl.⁵ .................. F16D 65/24; B60T 13/22
[52] U.S. Cl. ........................... 188/170; 92/130 A; 303/9.76
[58] Field of Search ............... 180/170; 303/71, 9.76; 92/63, 64, 130 A

[56] References Cited

U.S. PATENT DOCUMENTS

| | | | |
|---|---|---|---|
| 2,854,954 | 10/1958 | Howze | 92/130 A X |
| 2,992,630 | 7/1961 | Leighton et al. | 92/130 A X |
| 3,187,642 | 6/1965 | Cruse | 92/63 X |
| 3,508,469 | 4/1970 | Williams | 92/63 |
| 3,547,234 | 12/1970 | Cummins et al. | 188/170 |
| 3,599,760 | 8/1971 | Moss | 188/170 |
| 3,712,181 | 1/1973 | Swander, Jr. et al. | 188/170 X |
| 3,926,094 | 12/1975 | Kurichh et al. | 92/130 A X |
| 3,977,308 | 8/1976 | Swander, Jr. et al. | 92/63 |

Primary Examiner—Douglas C. Butler
Attorney, Agent, or Firm—Foley & Lardner

[57] ABSTRACT

An apparatus for actuating an emergency brake on loss of fluid pressure in a brake system, the apparatus including a housing for one or more compression springs, a piston and cylinder assembly mounted in the housing and being operatively connected to the fluid system and to the emergency brake to release the brake on sensing brake system fluid pressure and to apply the brake on loss of system pressure in the brake system, the spring or springs being permanently housed in the housing in a precompressed condition so that the piston and cylinder assembly can be removed from the housing without releasing the springs.

10 Claims, 3 Drawing Sheets

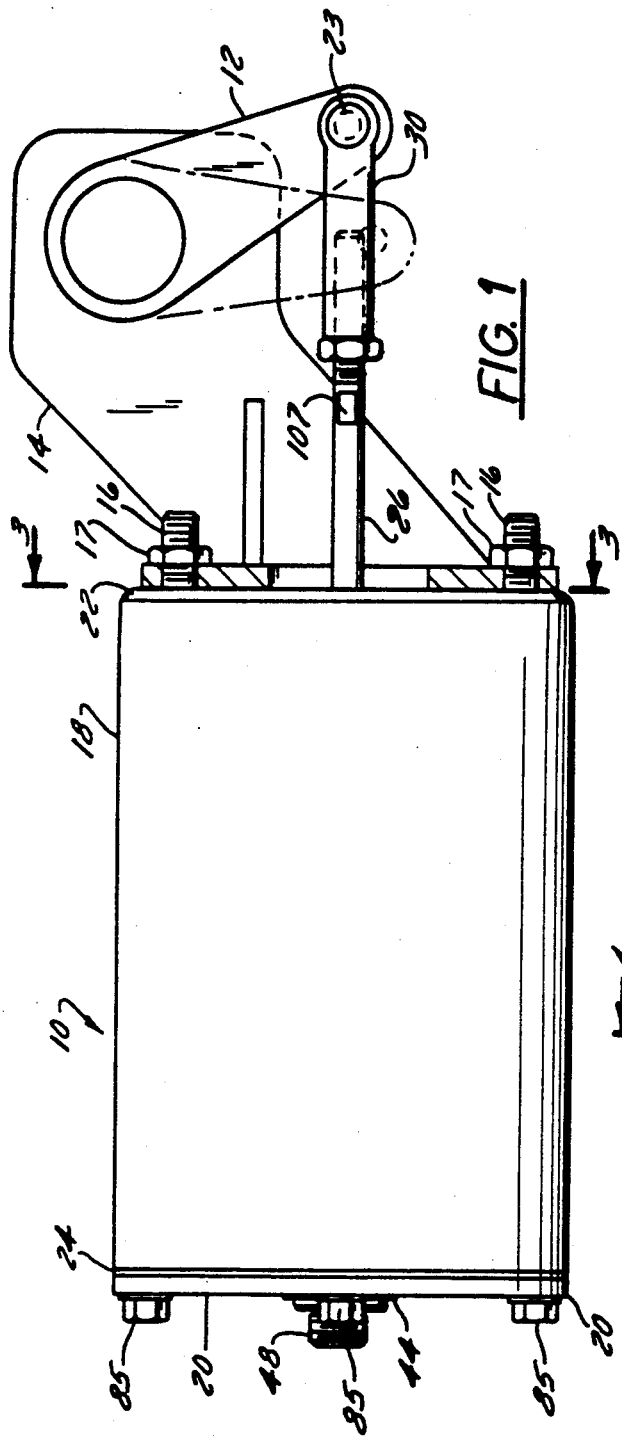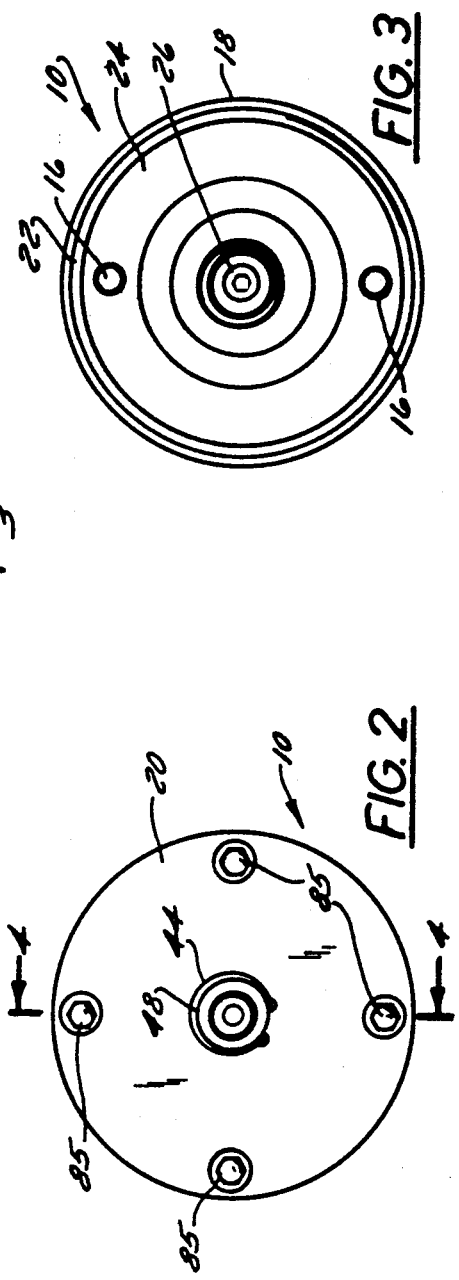

SPRING APPLIED/PRESSURE RELEASE EMERGENCY BRAKE ACTUATOR

BACKGROUND OF THE INVENTION

1. Field of the Invention

The present invention relates to fluid pressure operated brake systems and more particularly to an apparatus for actuating an emergency brake on loss of fluid pressure in the brake system.

2. Description of the Prior Art

Emergency brake actuators which are responsive to pressure in a brake system are used in various types of devices such as turbines, off-road vehicles and the like to prevent damage in the event of loss of system pressure. Generally these actuators include a single large compression spring which is housed within one end of a cylindrical housing to actuate the emergency brake on loss of system pressure. The other end of the cylindrical housing is used as a fluid pressure chamber for compressing the spring to release the emergency brake when the brake system is pressurized. The actuator must provide an instantaneous response to a loss of pressure in the system in order to prevent damage to the wind turbine, off-road vehicle or the like.

The compression spring is initially partially compressed within the housing to hold the emergency brake in the applied position. When the fluid system is pressurized, the pressure chamber is filled with hydraulic fluid to fully compress the spring and release the emergency brake. When fully compressed the spring must have sufficient force to not only actuate the emergency brake but to also discharge the pressurized fluid from the chamber. This can cause a momentary delay in applying the brake due to the large amount of fluid in the pressure chamber. Special care is necessary in handling and repairing these actuators since the spring force of the precompressed spring is sufficient to cause an explosion on opening the housing. Extreme caution is therefore required in order to avoid accidents on opening of the spring housing.

If a single high compression spring is used to provide the force necessary to operate the actuator, the spring force of the spring can deteriorate over time due to the high stress on the spring when fully compressed. A high compression spring can lose from 10% to 21% of its force capability if held under compression over a long period of time.

SUMMARY OF THE PRESENT INVENTION

The emergency brake actuator according to the present invention includes an independent piston and cylinder assembly and an independent precompressed spring assembly. The two assemblies are so constructed and arranged that they can be assembled and disassembled without releasing the precompressed spring assembly. The spring assembly includes one or more compression springs which are permanently mounted in a canister.

The individual springs in the spring assembly have maximum spring loads much lower than required for a single large spring and as a result are subject to a lower stress time creep effect in the order of 2%.

The piston and cylinder assembly is mounted within the canister in a coaxial relation to the spring or springs. The springs are seated at one end on the end plate of the canister and at the other end on a cup which is operatively connected to the piston and cylinder assembly to allow for full compression of the springs when the piston and cylinder assembly is pressurized to release the brake.

One of the primary advantages of this arrangement is the ability to use a small piston and cylinder assembly to compress the springs which can be depressurized in a minimum of time.

Another advantage of the invention is the ability to quickly and easily remove the piston and cylinder assembly from the spring assembly for maintenance and repair without releasing the springs which are permanently mounted in the canister.

A particularly important feature of this invention is the permanent mounting of the precompressed springs in a tamper proof canister thereby reducing the hazard of premature release of the compressed springs.

Another feature of the present invention is the provision of an oil containment reservoir to seal the piston and cylinder assembly within the spring assembly and thereby prevent contamination of the piston and cylinder assembly, while guaranteeing a leak free assembly.

Other principal features and advantages of the invention will become apparent to those skilled in the art upon review of the following drawings, the detailed description and the appended claims.

DETAILED DESCRIPTION OF THE DRAWINGS

FIG. 1 is a side elevation view of the brake actuator according to the invention shown connected to a caliper brake lever arm.

FIG. 2 is an end view of the housing.

FIG. 3 is a view taken on line 3—3 of FIG. 1 showing the pistol and cylinder assembly.

Figure 4:
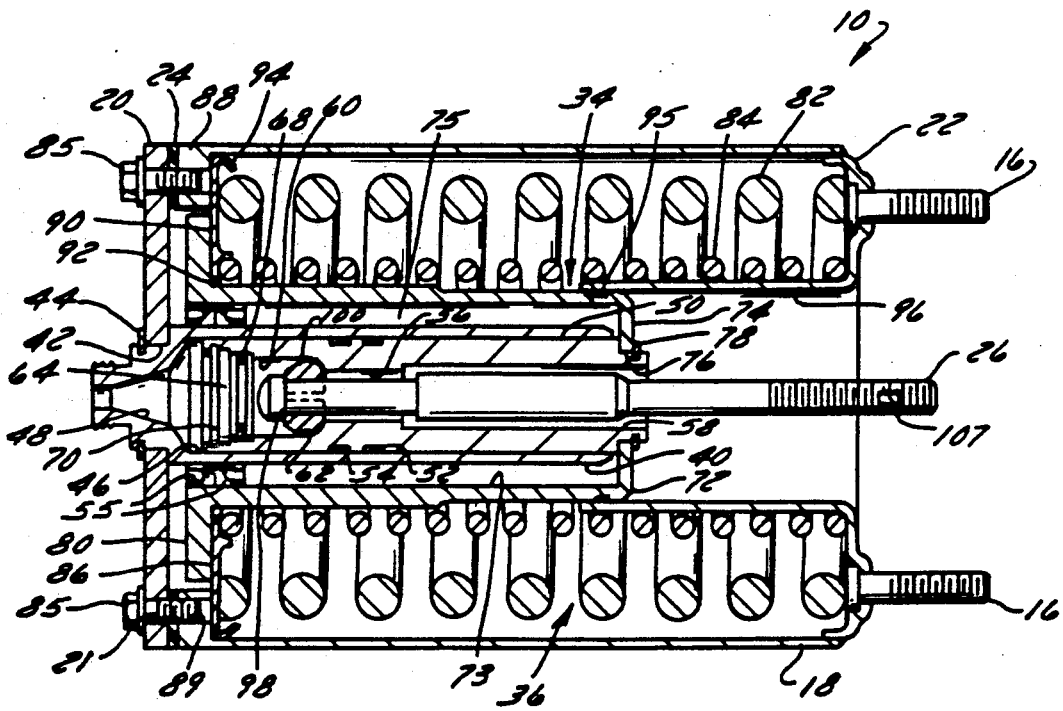
FIG. 4 is a view taken on line 4—4 of FIG. 2 showing the spring assembly disconnected from the brake lever with the springs seated on the spring retainer ring.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purposes of description and should not be regarded as limiting.

DETAILED DESCRIPTION OF THE PREFERRED EMBODIMENTS

Figure 6:
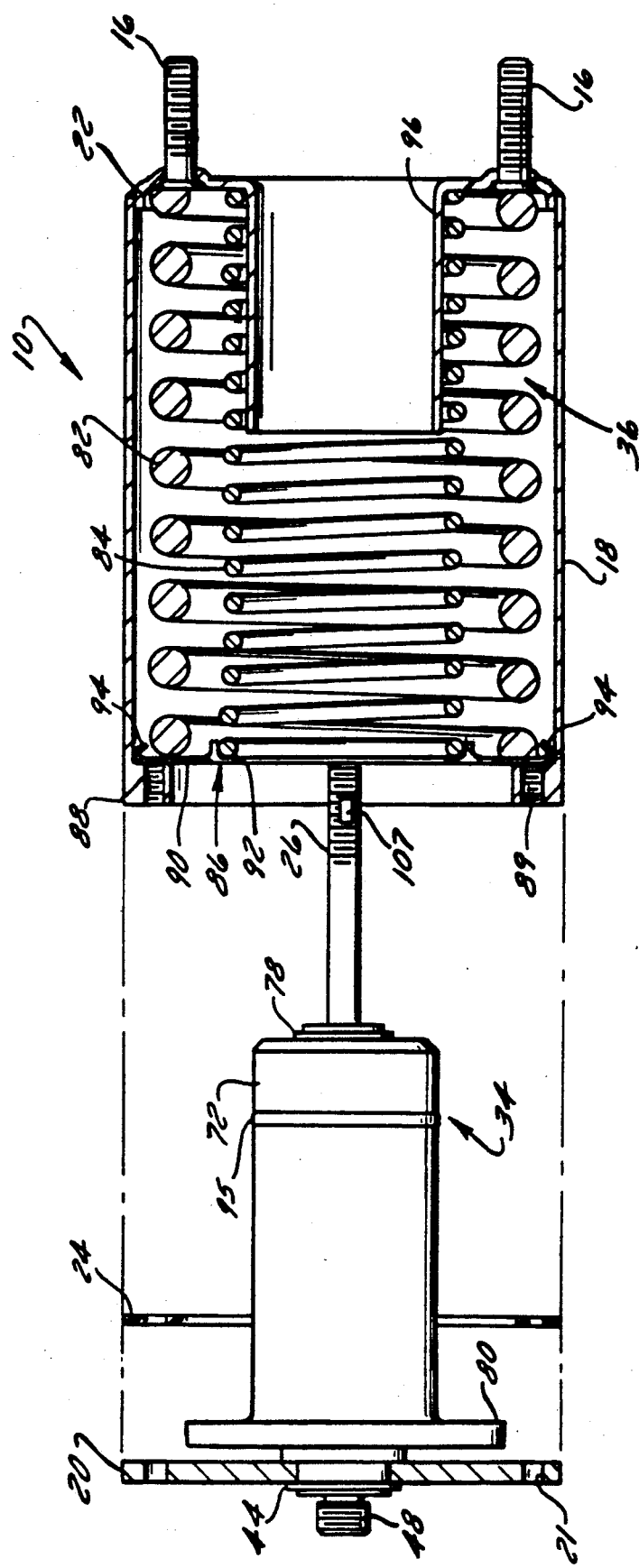
FIG. 6 is an exploded view partly in section showing the separation of the piston assembly from the spring assembly.

The pressure release actuator 10 according to the invention as seen in FIG. 1 is shown connected to the pivot arm 12 for a caliper brake (not shown). The actuator 10 generally includes a piston and cylinder assembly 34 and a spring assembly 36. As seen in FIG. 6 the piston and cylinder assembly 34 is an independent unit which can be removed from the spring assembly 36 without releasing the springs 82 and 84 from the spring assembly 36. The actuator 10 is mounted on a fixed bracket 14. The piston and cylinder assembly 34 is connected to the pivot arm 12 by means of a rod 26 and to the fluid pressure system (not shown) through a venturi nozzle 48.

Figure 5:
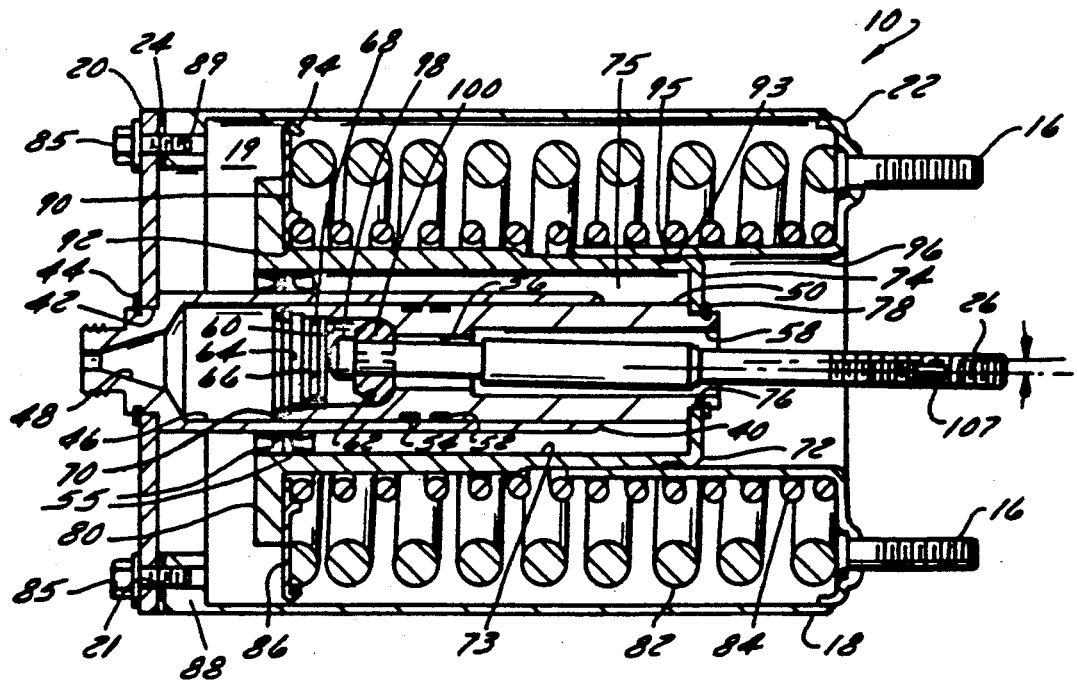
FIG. 5 is a view similar to FIG. 4 showing the position of the piston when the brake is set.

The piston and cylinder assembly 34 as seen in FIGS. 4 and 5 includes a cylinder 40 having a piston 50 mounted for axial motion therein. The cylinder 40 includes a pressure chamber 46 having a nozzle 48 mounted on one end. The piston 50 is sealed in the chamber 46 by means of a double lip seal 52 and 54. The piston 50 includes an axial passage 56 having a counterbore 58 at one end. A chamber 60 is provided at the other end of the bore 56 which is connected to the axial passage 56 by means of a spherical seat 62. The chamber 60 is sealed by means of a plug 64 having a peripheral groove 66 for an O-ring seal 68. The plug 64 is retained within the chamber 60 by means of a retainer ring 70.

A spring compressor 72 is mounted on the piston 50 in a position to compress the springs 82 and 84. The spring compressor 72 as described hereinafter includes a cylinder 73 having a radial flange 80 at one end and an end plate 74 at the other end having a central aperture 76. The compressor 72 is mounted on the piston 50 by aligning the aperture 76 on the end of the piston 50. The compressor 72 is secured to the piston by a snap ring 78 and is sealed thereto by means of a plastic sealant or an O-ring seal. A mounting plate 20 having bolt holes 21 and a central opening 42 is mounted on the end of cylinder 40 and is retained thereon by snap ring 44.

The spring assembly 36 includes a housing 18 having an end plate 22 welded to one end of the housing. The weld must go all the way around the housing for strength and sealing of the plate 22 to the housing 18. A pair of compression springs 82, 84 are shown seated at one end on the end plate 22. Although two springs are shown and described herein, it is within the contemplation of the invention to use one, two or three springs having different spring ratios depending upon the force required for a particular application.

A spring plate 86 is seated on the end of springs 82 and 84 and is permanently retained within the housing 18 by means of a bolt ring 88 which is welded to the end of the housing 18. Because of the high compression forces required for this type of application it is imperative that the springs be permanently secured to the housing 18. One form of connection would be to weld the bolt ring to the housing and thereby prevent removal of the bolt ring during repair or replacement of the piston and cylinder assembly. The outer end of plate 22 is to be connected to bracket 14 by means of bolts 16 and nuts 17. An inner cylinder 96 is provided on the inside of plate 22 and extends axially into the inner spring 84. It should be noted that the springs are partially compressed on assembly to provide a maximum spring force when fully compressed to release the brake.

The spring plate 86 includes a flat section 90 having a central opening 92 and a curved flange 94 at the outer edge. It should be noted that the opening 92 is slightly larger than the diameter of the cylinder 73 and the flange 94 is slightly smaller than the diameter of the housing 18. The diameter of the opening 92 and the diameter of the flange ring 94 are such that any lateral motion of the plate 86 will be limited by the engagement of the flange 94 with the inside of the housing. The opening 92 is such that it cannot engage the cylinder 73 on lateral movement of the plate 86.

Means are provided on the end plate 22 to limit the lateral movement of the spring 84 so that it does not engage the cylinder 72. Such means is in the form of the cylinder 96 provided on the plate 22 and located between the second spring 84 and the cylinder 73. If a greater compressive force is required a third spring (not shown) can be positioned between the first spring 82 and the second spring 84.

The piston and cylinder assembly 34 is mounted on the spring assembly 36 by aligning the holes 21 in plate 20 with the threaded holes 89 in bolt ring 88. Bolts 85 are then inserted through holes 21 into threaded holes 89. Gasket 24 is provided between the plate 20 and the bolt ring 88 to seal the canister 22. Contamination of the surrounding environment by leakage of oil from the chamber 46 in the piston and cylinder assembly 34 is controlled by a series of sealed chambers 75 and 19. The secondary oil containment chamber 75 is formed within cylinder 73 to capture any oil that seeps from primary oil pressure chamber 46 through the two seals 52, 54. The chamber 75 is sealed by means of a double lip seal 55 provided between cylinder 40 and cylinder 73 and the plastic seal or O-ring provided between the snap ring 78 and the flange 74 at the end of cylinder 73. A tertiary chamber 19 within the housing 18 is sealed by means of the gasket 24 provided between plate 20 and ring 88 the seal 95, and a plastic or O-ring seal provided between snap ring 44 and opening 42. The sealed chambers 19 and 75 also prevent contamination of the oil in chamber 46 from foreign matters in the surrounding environment.

The piston 50 is connected to the lever arm 12 for the brake by means of the rod 26 which is axially aligned in the bore 56 of piston 50. The rod 26 includes a head 98 at the inner end. The rod is retained in the chamber 60 by means of a split spherical member or plug 100 that is mounted on the rod below the head 98 and forms a ball joint in connection with the spherical seat 62 in the end of the piston 50. With this arrangement the rod 26 is free to rotate or pivot with respect to the piston 50. In this regard it should be noted that the rod is connected to lever 12 for the brake. The arc of travel of the connection of the piston to the lever arm 12 as seen in FIG. 1 causes the rod to pivot with respect to the piston 50. With this arrangement and considering the ball joint location far from the threaded end, the rod 26 will not introduce any significant side load forces on the piston 50.

In operation, the cylinder 40 is pressurized when the fluid system is pressurized. The piston 50 will be forced toward the end of the chamber 46 and the rod 26 will push the lever arm 12 to a position to open or release the brake. As the rod 26 moves outwardly, it is free to pivot on the special seat 62 to compensate for any misalignment of the rod 26 with respect to the lever 12.

In the event of a loss of hydraulic pressure in the system (FIG. 5), the springs 82 and 84 will force the piston 50 toward the open end of the chamber 46 in the cylinder 40. Fluid in the cylinder will be forced out of the chamber 46 through the opening 48. The return motion of the piston 50 will rotate the lever arm 12 to set the brake as shown in phantom in FIG. 1. The spring force of the compressed springs 82 and 84 must be sufficient to discharge the fluid from chamber 46 in cylinder 40 almost instantaneously.

If it is desired to release the brake on loss of pressure, the rod 26 can be manually disconnected from the connector 30. This can be accomplished by providing a flat section 107 on each side of the rod 26 adjacent to the threaded end of the rod 26. The rod can be unscrewed from the connector 30 by engaging the flats 107 with a wrench to turn the rod. This is of particular importance if there is a loss of pressure in an off road vehicle. If the brake cannot be released, the vehicle could not be moved for repair or replacement of parts.

Thus, it should be apparent that there has been provided in accordance with the present invention a spring applied/pressure release emergency brake actuator that fully satisfies the aims and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A spring applied pressure release actuator for activating an emergency brake on loss of pressure in a fluid operated brake system, said actuator comprising a housing having an end plate at one end of said housing, a number of compression springs seated on said end plate in said housing, a mounting ring secured to the other end of said housing with said springs being permanently precompressed in said housing between said end plate and said mounting ring, a hydraulic piston and cylinder assembly mounted on said mounting ring in axial alignment within said springs, said piston and cylinder assembly including a cylinder operatively connected to the fluid system and a piston mounted for axial motion in said cylinder between a brake release and a brake setting position, a spring compressor operatively connected to said piston to compress said springs when said piston is moved to the brake release position, a rod connecting said piston to the emergency brake, said piston being moved to the brake release position when said cylinder is pressurized to compress the springs, whereby said springs will bias said piston to said brake setting position on loss of pressure in the fluid system.

2. A spring actuated/pressure release actuator for closing an emergency brake on loss of system pressure, said actuator comprising a spring assembly including a number of compression springs of varying spring force and a piston and cylinder assembly coaxially aligned within said compression springs, said piston and cylinder assembly being operatively connected to compress said springs and release the emergency brake on sensing system pressure whereby the cumulative spring force of said springs will apply said emergency brake on loss of system pressure.

3. The actuator according to claim 2 wherein said spring assembly includes a housing having an end plate at one end, a mounting ring at the other end and a spring plate seated on said mounting ring with said springs partially compressed between said end plate and said spring plate, said piston and cylinder assembly being mounted on said mounting ring and including a piston positioned to engage said plate and compress said springs.

4. The actuator according to claim 3 wherein said piston includes an axial bore, an actuating rod connecting said piston to the emergency brake and means in said bore for allowing said rod to pivot relative to said piston to compensate for any misalignment between said rod and the brake.

5. The actuator according to claim 4 including means on said rod for releasing said rod from the brake when the brake is closed.

6. The actuator according to claim 3 wherein said mounting ring is permanently secured to said housing to prevent removal of said springs from said housing during repair and replacement of said piston and cylinder assembly.

7. An emergency brake actuator for activating a brake on loss of hydraulic pressure in a fluid brake system, said actuator comprising a spring assembly including;
 a hollow cylindrical housing,
 a number of compression springs coaxially mounted in said housing, and
 means mounted on said housing for permanently holding said springs in said housing in a partially compressed condition; and
 a hydraulic piston and cylinder assembly mounted in said housing within said springs and in a coaxial relation to said springs,
 said assembly including a cylinder operatively connected to the fluid brake system and a piston connected to said emergency brake, and
 said springs being operatively connected to bias said piston to an emergency brake applying position on loss of pressure in said cylinder.

8. The actuator according to claim 7 including a spring compressor mounted on said piston and a spring plate mounted on said spring compressor and being positioned to engage said springs whereby said springs will be fully compressed when said piston is pressurized to open said emergency brake.

9. The actuator according to claim 8 including means for sealing said spring compressor to said cylinder to form a fluid containment chamber between said piston and cylinder assembly and said spring compressor.

10. The actuator according to claim 9 including means for sealing said housing to form a second fluid containment chamber around said first fluid containment chamber.

* * * * *